United States Patent
Kishimoto (10) Patent No.: US 10,623,589 B2
(45) Date of Patent: Apr. 14, 2020

(54) IMAGE FORMATION SYSTEM AND CONTROL METHOD OF IMAGE FORMATION SYSTEM CAPABLE OF DETERMINING MODE SHIFT CONDITION

(71) Applicant: KONICA MINOLTA, INC., Chiyoda-ku, Tokyo (JP)

(72) Inventor: Kazuhisa Kishimoto, Mitaka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/164,911

(22) Filed: Oct. 19, 2018

(65) Prior Publication Data

US 2019/0182388 A1  Jun. 13, 2019

(30) Foreign Application Priority Data

Dec. 7, 2017  (JP) .................... 2017-235071

(51) Int. Cl.
 *H04N 1/00* (2006.01)
(52) U.S. Cl.
 CPC ..... *H04N 1/00037* (2013.01); *H04N 1/00204* (2013.01)
(58) Field of Classification Search
 None
 See application file for complete search history.

(56) References Cited

U.S. PATENT DOCUMENTS

| 2011/0228327 | A1* | 9/2011 | Maeda | G06K 15/406 358/1.15 |
| 2013/0036319 | A1* | 2/2013 | Tanaka | G03G 15/5004 713/323 |
| 2017/0111535 | A1* | 4/2017 | Morimoto | H04N 1/00896 |
| 2017/0272946 | A1* | 9/2017 | Watanabe | H04L 63/0853 |
| 2018/0131824 | A1* | 5/2018 | Kamasuka | H04N 1/00411 |

FOREIGN PATENT DOCUMENTS

JP    2016148716 A   8/2016

* cited by examiner

*Primary Examiner* — Lenin R Rodriguezgonzalez
(74) *Attorney, Agent, or Firm* — Buchanan Ingersoll & Rooney PC

(57) ABSTRACT

When "operation which is not directly connected to job execution" is performed in an operation screen of a terminal device, by setting an image formation device to a power saving state, energy saving is achieved. An image formation system has: a power mode determining unit determining a shift condition of shifting to any of power states on the basis of an operation directly connected to job execution and an operation which is not directly connected to job execution, which is input to an operation screen displayed in an operation terminal; and a power state control unit shifting an MFP to any of the power states on the basis of the shift condition determined by the power mode determining unit.

17 Claims, 9 Drawing Sheets

FIG. 1

FIG. 6
(OPERATION AT CLOSE RANGE)

FIG. 7
(OPERATION AT LONG RANGE)

FIG. 10A  ⟨OPERATION AT LONG RANGE⟩

⟨IMAGE FORMATION DEVICE⟩

JOB EXECUTION STATE

NORMAL STATE

POWER SAVING STATE

FIG. 10B  ⟨OPERATION PANEL⟩

NORMAL BRIGHTNESS

DARKER THAN NORMAL t1  t2  t3  t4  t5  t6  t7

START | BOX PRINT | LIST DISPLAY | SCROLL | SCROLL | JOB SELECTION | JOB EXECUTION

IMAGE FORMATION SYSTEM AND CONTROL METHOD OF IMAGE FORMATION SYSTEM CAPABLE OF DETERMINING MODE SHIFT CONDITION

CROSS-REFERENCE TO RELATED APPLICATIONS

The entire disclosure of Japanese Patent Application No. 2017-235071, filed on Dec. 7, 2017, is incorporated herein by reference in its entirety.

BACKGROUND

Technological Field

The present invention relates to an image formation system and a control method of an image formation system and, more particularly, relates to an image formation system and a control method of an image formation system capable of performing remote operation of an image formation device.

Description of the Related Art

Some of image formation devices such as MFP (Multi-Functional Peripheral) can control a power state as a normal power state in which image forming operation can be executed and a power saving state in which image forming operation cannot be executed. Such an image formation device shifts the normal power state to the power saving state, for example, in such a case that user operation is not performed for predetermined time or there is no user in a predetermined range, thereby realizing energy saving.

Recently, an image formation device can perform wireless communication with a terminal device such as a tablet or smartphone, and remote operation of the image formation device using the terminal device is performed. Japanese Unexamined Patent Application Publication No. 2016-148716 (Patent Literature 1) discloses an image formation device realizing both energy saving and handleability by including a unit measuring distance between an operation panel for performing remote operation and the image formation device and a unit determining an image forming operation request from the operation panel and determining the power state according to combination of the distance and the request.

CITATION LIST

Patent Literature

[Patent Literature 1] Japanese Unexamined Patent Application Publication No. 2016-148716

SUMMARY

In the above-described image formation device, there are "copy", "scan", and "print" as image forming operation requests operated by the operation panel. For example, when the operation of "copy" is performed, only a part corresponding to the "copy" operation of the image formation device is set to the normal power state, thereby achieving the object of energy saving.

However, the image forming operations have a plurality of kinds such as screen transition operation, job setting operation, job execution operation, and information obtaining operation such as "help". The operations can be roughly divided to "operations directly connected to job execution" and "operations which are not directly connected to job execution". For example, when the part corresponding to the copy operation is set in the normal power state in the case of performing the "operation which is not directly connected to job execution" such as the screen transition operation or information obtaining operation such as "help" during the "copy" operation, since the copy operation (job) is not actually executed, the power is wasted.

Consequently, an object of the present invention is to achieve energy saving by setting the power state of the image formation device to the power saving state when the "operation which is not directly connected to job execution" is performed in the operation screen of the terminal device.

To solve the problem and achieve the object of the present invention, according to an aspect of the present invention, an image formation system of the present invention includes: an image formation device; and a terminal device operating the image formation device, and having a plurality of power states including a normal power state of waiting in a state where a job can be executed in the image formation device and a power saving state of waiting in a state where a job cannot be executed in the image formation device and a state where power consumed is smaller than that in the normal power state. The system further includes: an operation determining unit determining an operation which is input to an operation screen of the terminal device; a power mode determining unit determining a shift condition of shifting the image formation device to a predetermined power state on the basis of an operation directly connected to job execution or an operation which is not directly connected to job execution determined by the operation determining unit; and a power state control unit shifting the image formation device to a predetermined power state on the basis of the shift condition determined by the power mode determining unit.

A control method of an image formation system of the present invention is a control method of an image formation system including: an image formation device; and a terminal device operating the image formation device, and having a plurality of power states including a normal power state of waiting in a state where a job can be executed in the image formation device and a power saving state of waiting in a state where a job cannot be executed in the image formation device and a state where power consumed is smaller than power in the normal power state. The method includes: determining an operation which is input to an operation screen of the terminal device so as to distinguish an operation directly connected to job execution and an operation which is not directly connected to job execution; determining a power mode of determining a shift condition of shifting to a predetermined power state on the basis of an operation determined; and shifting the image formation device to any of the power states on the basis of the determined power mode.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinbelow, an example of embodying an image formation system according to an embodiment of the present invention (hereinbelow, called the embodiment) will be described with reference to the drawings. In the following description, the same reference numeral is designated to the same parts and components. The names and functions are the same. The present invention is not limited to the following embodiments.

Device Configuration

Figure 1:
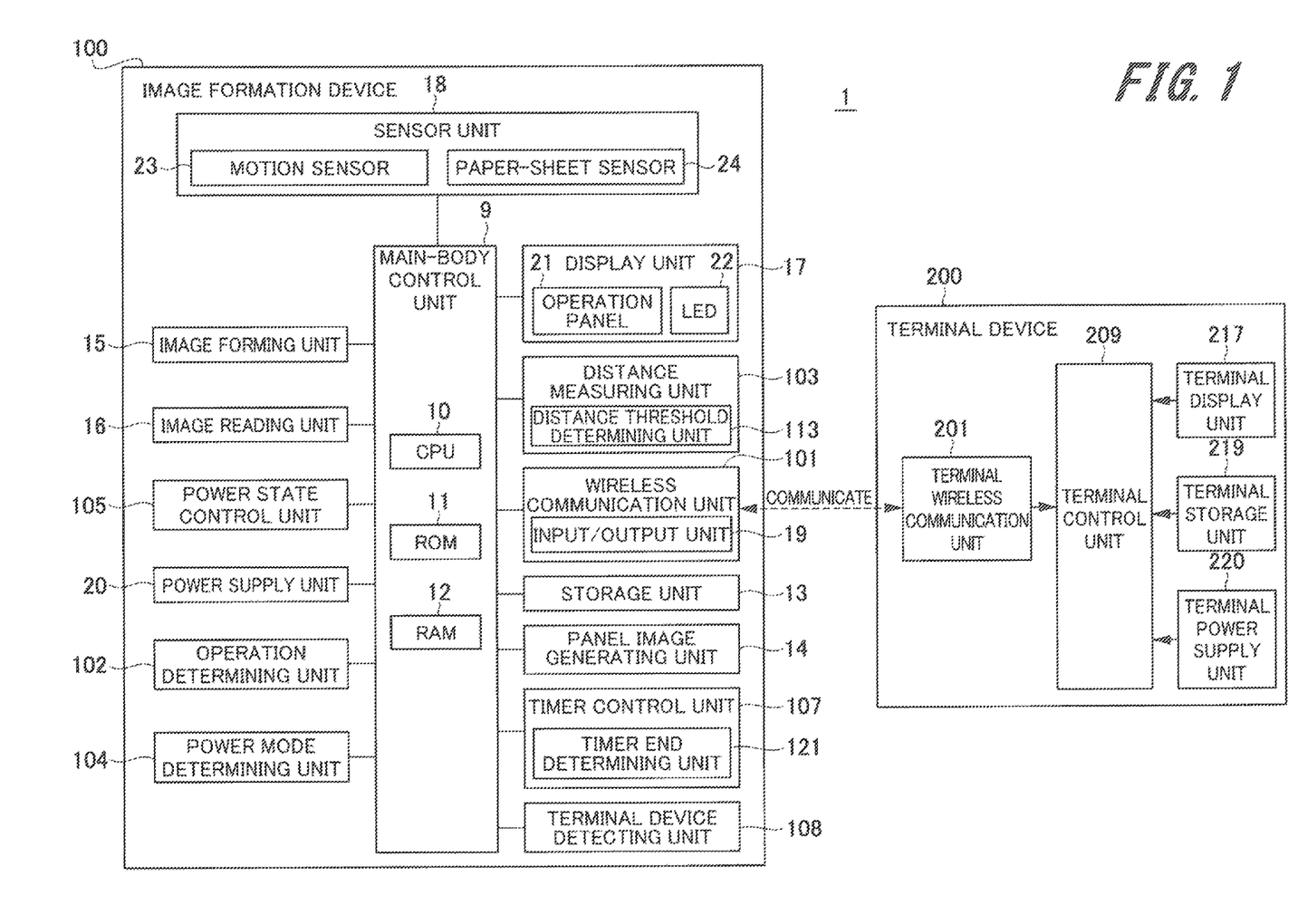
FIG. 1 is a conceptual diagram of an image formation device and a terminal device of an image formation system according to an embodiment of the present invention.

FIG. 1 is a conceptual diagram of an image formation device 100 and a terminal device 200 constructing an image formation system 1 of the embodiment and is a block diagram expressing the configuration of an MFP (Multi-Functional Peripheral) 100 as an example of the image formation device and the configuration of an operation terminal 200 as an example of the terminal device.

As illustrated in FIG. 1, the MFP 100 includes: a main-body control unit 9 having a CPU (Central Processing Unit) 10 for controlling the whole image formation device, a ROM (Read Only Memory) 11 for storing a program executed by the CPU 10, and a RAM (Random Access Memory) 12 as a work region when the CPU 10 executes the program; and a storage unit 13 having an HDD (Hard Disk Drive) for storing various data such as image data.

The MFP 100 also includes a panel image generating unit 14, an image forming unit 15, an image reading unit 16, a display unit 17, a sensor unit 18, an input/output unit 19, a power supply unit 20, a wireless communication unit 101, an operation determining unit 102, a distance measuring unit 103, a power mode determining unit 104, a power state control unit 105, a timer control unit 107, and a terminal device detecting unit 108.

When information of the operation is received from the operation terminal 200, the operation determining unit 102 specifies the information of the image forming operation requested by the operation terminal 200.

Based on the operation specified by the operation determining unit 102, the power mode determining unit 104 determines a power mode of supplying necessary power to the MFP 100. The power mode determining unit 104 determines a power mode with reference to the various data stored in the storage unit 13. Further, the power mode determining unit 104 may determine a power mode in consideration of distance derived by the distance measuring unit 103.

By controlling power supply to the units in the MFP 100 by the power supply unit 20, the power state control unit 105 controls the power state of the MFP 100. That is, the power supply control unit 105 sets the MFP 100 to a predetermined power state on the basis of the information of the image forming operation requested by the operation terminal 200.

The distance measuring unit 103 derives the distance from the MFP 100 to the operation terminal 200. The method of deriving the distance from the MFP 100 to the operation terminal 200 by the distance measuring unit 103 is not limited to a specific method. As an example, the distance measuring unit 103 derives the distance by detecting the distance from intensity of communication (electric wave) between the MFP 100 and the operation terminal 200. As another example, the distance measuring unit 103 may derive the distance by calculating the distance from the position of the MFP 100 obtained by using the GPS (Global Positioning System) and the position of the operation terminal 200 transmitted from the operation terminal 200. As another example, the distance measuring unit 103 may derive the distance by detecting the distance by using an infrared ray sensor or the like. Further, the distance measuring unit 103 has a distance threshold determining unit 113 determining whether or not the derived distance exceeds a predetermined distance threshold which is set. The distance threshold is properly set according to the positional relation (distance) between the MFP 100 and the operation terminal 200.

When there are a plurality of operation terminals 200, the distance measuring unit 103 derives the distance to the MFP 100 on the basis of the position of the operation terminal 200 communicated with the MFP 100 last.

The timer control unit 107 has a timer measuring lapse time of timer set time, determining waiting time until the MFP 100 shifts from the normal power state to the power saving state. According to an operation, the timer control unit 107 performs "timer restart" which restarts measurement of lapse time by the timer from the beginning. The timer control unit 107 has a timer end determining unit 121 determining whether the measured lapse time exceeds the timer set time (waiting time) or not.

When an operation panel 21 is constructed attachably/detachably to/from the MFP 100, the terminal device detecting unit 108 detects whether the operation panel 21 is attached to the MFP 100 or not.

Figure 2:
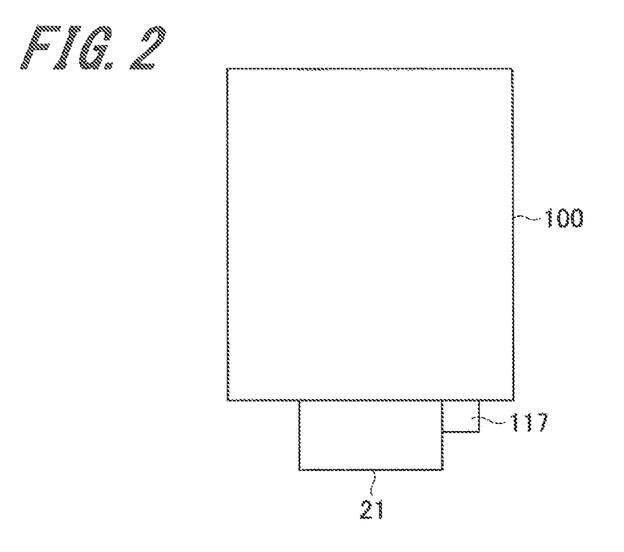
FIG. 2 is a schematic configuration diagram of the case where an MFP has a terminal detection device in the image formation system according to the embodiment of the present invention.

With reference to FIG. 2, the terminal device detecting unit 108 will be described. FIG. 2 is a schematic configuration diagram of the MFP 100 having a terminal detection device 117. As illustrated in FIG. 2, the terminal device detecting unit 108 has the terminal detection device 117 provided for the MFP 100. The terminal detection device 117 detects whether the operation panel 21 is attached to the MFP 100 or not by transmitting, to the main-body control unit 9, an ON signal when the operation panel 21 is attached to the MFP 100 and an OFF signal when the operation panel 21 is detached from the MFP 100 and used as the operation terminal 200.

When the terminal device detecting unit 108 detects that the operation panel 21 is attached to the MFP 100, by changing the distance derived by the distance measuring unit 103 to a predetermined value (distance threshold) or less, the power state of the MFP 100 is prevented from easily shifting to the power saving state and the handleability for the user may be assured.

In the storage unit 13, various data and tables necessary for operation process are stored.

The panel image generating unit 14 generates an image of the operation screen displayed on the display unit 17 and a terminal display unit 217.

The display unit 17 includes the operation panel 21 as a display device and an LED (Light Emitting Diode) 22. The operation panel 21 includes a touch panel, and the operation screen is displayed so as to be superimposed on the touch panel. The LED 22 performs notification according to the operation state by light-on/light-off.

A printer as the image forming unit 15 includes all of mechanisms for performing printing operation. For example, when the printer 15 is of an electrophotographic type, the printer 15 includes mechanisms for performing a series of operations of generating a toner image by forming an electrostatic image on a photoreceptor on the basis of image data, fixing the toner image on a sheet, and ejecting the sheet. Concretely, the printer 15 includes a drive mechanism for driving the photoreceptor, a drive mechanism for driving a transfer member, a carrying mechanism for carrying a sheet of paper, and a heating mechanism for heating the sheet to thermally fix the toner image on the sheet to the sheet.

A scanner as the image reading unit 16 includes all of mechanisms for performing scanning operation. For example, when the scanner 16 includes an Auto Document Feeder (ADF), the scanner 16 includes a carrying mechanism for carrying an original which is set to a read position, a mechanism for operating a sensor disposed in the read position, and the like.

The sensor as the sensor unit 18 includes a motion sensor 23 and a paper-sheet sensor 24. The motion sensor 23 detects the presence of the user within a specific range from the MFP 100. The motion sensor 23 detects the presence of the user by using, for example, infrared light, ultrasonic waves, visible light, or combinations of those. The paper-sheet sensor 24 is disposed in a position where the original of the scanner 16 is set and detects the presence of the original which is set in the scanner 16. The paper-sheet sensor 24 detects the presence of a sheet by using, for example, visible light, reflection light, or the like.

A power supply circuit as the power supply unit 20 converts power supplied from a commercial power supply via a plug to a form adapted to each of the components and supplies it to each of the components. According to an instruction from the CPU 10, the power supply circuit 20 supplies the power to the panel image generating unit 14, the printer 15, and the scanner 16 as parts necessary for image forming operations.

The operation terminal 200 has a terminal wireless communication unit 201, a terminal control unit 209, the terminal display unit 217, a terminal storage unit 219, and a terminal power supply unit 220. As the operation terminal 200, for example, a mobile device such as a smartphone or the operation panel 21 constructed to be attachable/detachable to/from the MFP 100 as described above can be used.

The MFP 100 and the operation terminal 200 can perform wireless communication to each other via the wireless communication unit 101 and the terminal wireless communication unit 201. That is, the operation terminal 200 can perform remote operation on the MFP 100 by communicating with the MFP 100.

Outline of General Control

The MFP 100 is subject to the remote operation from the operation terminal 200.

The MFP 100 can execute a plurality of kinds of image forming operations which include copying, scanning, and printing. The copying operation refers to an operation of reading an original by the scanner 16 and printing the obtained image data to a paper sheet by the printer 15. The scanning operation refers to an operation of reading an original by the scanner 16 and storing the obtained image data to a designated memory (for example, a memory associated with the user, also called BOX or the like) or transmitting the data to a designated destination. The printing operation refers to an operation of printing image data read from the designated memory such as the BOX or image data received from another device to a paper sheet by the printer 15.

The power state control unit 105 of the MFP 100 has a plurality of power state modes (hereinbelow, called power modes) at the time of executing the copying, scanning, and printing operations. The plurality of power modes include: a job execution state in which the consumption power amount is large because a mechanical operation such as motor driving for printing operation is necessary; a normal state (for example, standby state) in which fixing heater temperature is maintained in a printable state so that printing can be started immediately and the consumption power amount is smaller than that in the job execution state; and a power-saving state (for example, sleep state) in which the consumption power amount is smaller than that in the normal state. The MFP 100 determines the power mode in accordance with the information of the image forming operation requested by the remote operation from the operation terminal 200 and, based on the power mode, performs the power control of the MFP 100.

Figure 3:
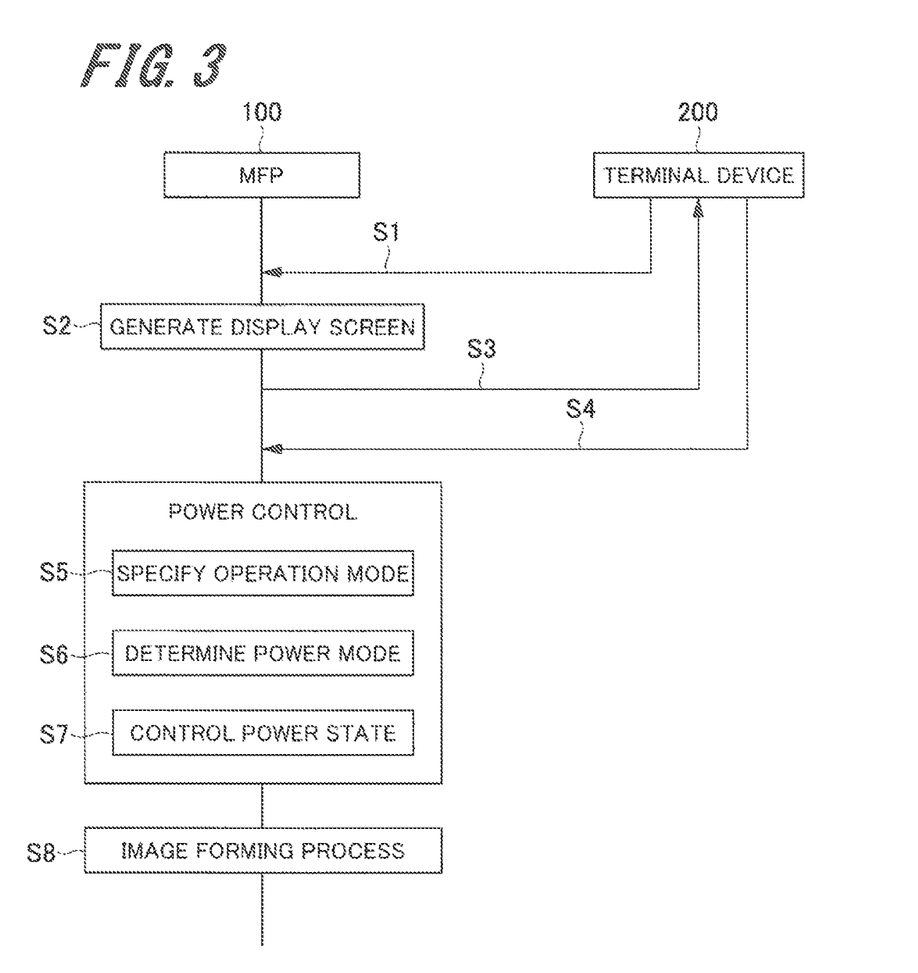
FIG. 3 is a flowchart diagram of entire control in the image formation system according to the embodiment of the present invention.

FIG. 3 is a flowchart diagram for explaining the entire flow of the power control in the image formation system 1 according to the embodiment.

As illustrated in FIG. 3, when an input operation from the user is received, the operation terminal 200 requests connection to the MFP 100 designated (step S1). At this time, the operation terminal 200 also requests display screen information for display in the terminal display unit 217.

The MFP 100 which received the connection request from the operation terminal 200 generates display screen information to be displayed by the operation terminal 200 in response to the connection request (step S2) and sends the generated display screen information to the terminal device 200 (step S3).

Examples of menu screens as display screen information may be icons such as "copy", "scan", and "print". Each of the screens is hierarchized to perform lower-order operations such as "screen shifting operation" and "information obtaining operation". By receiving the information of the image forming operation in the menu screen, the information of the image forming operation which is requested to the MFP 100 can be specified.

The information of the image forming operation executed by the MFP 100 designated by the user is transmitted to the MFP 100 (step S4).

The operation determining unit 102 of the MFP 100 specifies the operation mode according to the information of the image forming operation requested by the operation terminal 200 (step S5). The MFP 100 determines the power mode on the basis of the specified operation mode (step S6), and controls the power which is supplied on the basis of the determined power mode to control the power state of the MFP 100 (step S7).

At the time of specifying the operation mode, an operation mode determination table which is preliminarily stored in the storage unit 13 is used. Table 1 is an example of the operation mode determination table used in the embodiment.

TABLE 1

| Function mode | Operation key | Operation | Determination result (operation mode) |
|---|---|---|---|
| Copy | Sheet size | Job setting | Directly connected to job execution |
| Copy | Magnification | Job setting | Directly connected to job execution |
| Copy | The number of copies | Job setting | Directly connected to job execution |
| Copy | Copy start | Job execution instruction | Directly connected to job execution |
| Copy | Application | Screen shift | Not directly connected to job execution |
| Copy | Finishing | Screen shift | Not directly connected to job execution |
| Copy | Return | Screen shift | Not directly connected to job execution |
| BOX print | Job selection | Job setting | Directly connected to job execution |
| BOX print | The number of copies | Job setting | Directly connected to job execution |
| BOX print | Print start | Job execution instruction | Directly connected to job execution |
| BOX print | List display | Screen shift | Not directly connected to job execution |
| BOX print | Scroll | Screen shift | Not directly connected to job execution |
| BOX print | Return | Screen shift | Not directly connected to job execution |

The operation mode "directly connected to job execution" in Table 1 is an operation mode in which the possibility that image forming operation is executed immediately is high and the power state of the MFP 100 has to be set to the normal state. The operation mode "not directly connected to job execution" is an operation mode in which the possibility that image forming operation is executed immediately is low and there is no problem to shift the power state of the MFP 100 to the power saving state.

In step S6, the power mode determining unit 104 of the MFP 100 determines the power mode on the basis of the operation mode (determination result) determined according to the function mode, the operation key, and the operation in Table 1. The power state of the MFP 100 is controlled by the power state control unit 105.

The distance measuring unit 103 of the MFP 100 may derive the distance to the operation terminal 200 and, further, determine the power mode in consideration of the distance. At this time, a distance determination table stored in the storage unit 13 is used. Table 2 is an example of the distance determination table used in the embodiment.

TABLE 2

| Operation mode | Distance between operation terminal and image formation device | Determined shift condition |
|---|---|---|
| Directly connected to job execution | Closer than predetermined threshold | First shift condition |
| | Equal to or further than predetermined threshold | First shift condition |
| Not directly connected to job execution | Closer than predetermined threshold | First shift condition |
| | Equal to or further than predetermined threshold | Second shift condition |

In the embodiment, the MFP 100 has a plurality of power-saving shift conditions of shifting from the normal power state to the power saving state and has at least a first shift condition and a second shift condition in which shift to the power saving state is easier than the first shift condition. For example, under the first shift condition, restart is made by a timer every operation input of the user, and the power state of the MFP 100 is prevented from easily shifting to the power saving state. Under the second shift condition, restart is not made by the timer even an operation input of the user is received, and the power state of the MFP 100 is easily shifted to the power saving state.

In the case of using a plurality of operation terminals in which different timer setting times are set, as the first shift condition, by selecting an operation terminal in which timer setting time is longer, the power state of the MFP 100 may be prevented from easily shifting to the power saving state. As the second shift condition, by selecting an operation terminal in which timer setting time is shorter, the power state of the MFP 100 may be easily shifted to the power saving state.

In the case where the operation designated by the user is "directly connected to job execution", regardless of the distance derived by the distance measuring unit 103, the first shift condition is determined as the power mode. It prevents the power state of the MFP 100 from easily shifting to the power saving state so that the handleability for the user can be assured.

When the operation designated by the user is "not directly connected to job execution" and the distance derived by the distance measuring unit 103 is smaller than the distance threshold which is set to a predetermined value, even when the operation is "not directly connected to job execution", the user is in vicinity of the MFP 100 and the possibility that the device is used is high. In this case, by determining the first shift condition as the power mode to prevent the power state of the MFP 100 from easily shifting to the power saving state, the handleability for the user is assured. On the other hand, when the distance derived by the distance measuring unit 103 is larger than the predetermined distance threshold, the possibility that the device will be used soon is low. Consequently, by determining the second shift condition as the power mode to make the power state of the MFP 100 easily shifted to the power-saving state, energy saving is achieved.

The distance threshold used at the time of determining the power mode is determined by using the threshold determination table preliminarily stored in the storage unit 13. Table 3 is an example of the threshold determination table used in the embodiment.

TABLE 3

| Present heater temperature | Shift time to normal state (rise time) | Threshold of distance |
| --- | --- | --- |
| High temperature range | Short time | Short distance |
| Intermediate temperature range | Intermediate time | Intermediate distance |
| Low temperature range | Long time | Long distance |

In table 3, when the heater temperature of the MFP 100 (for example, the temperature of the fixing unit) is high, the rise time from the power saving state to the normal state is short, so that the distance threshold is set to be small. On the other hand, when the heater temperature of the MFP 100 is low, the rise time is long, so that the distance threshold is set to be large.

That is, in the case where the rise time is short, by making the distance threshold small, even when the user is relatively close to the MFP, the power state of the MFP 100 is easily shifted to the power saving state, thereby achieving energy saving. Since the device can be started immediately in this case, no problem occurs in the handleability for the user. On the other hand, when the rise time is long, by setting the distance threshold large, the power state of the MFP 100 is prevented from easily shifting to the power saving state. By preventing the power state of the MFP 100 from easily shifting to the power saving state as described above, the waiting time of the user is decreased so that the handleability can be assured.

The MFP 100 executes the image forming process according to the operation designated by the user (step S8).

Power State Control

Figure 4:
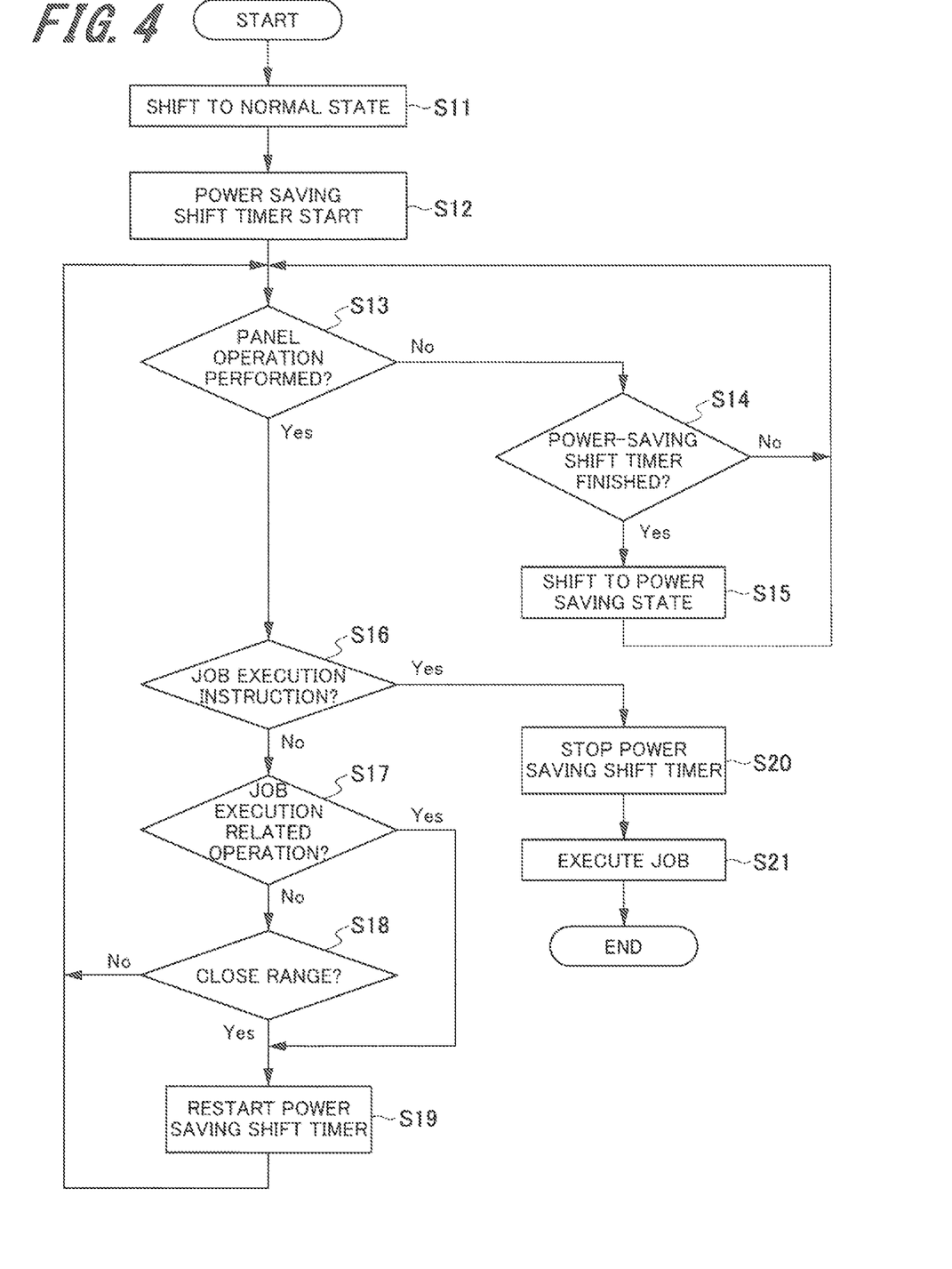
FIG. 4 is a flowchart of power state control of the image formation system according to the embodiment of the present invention.

FIG. 4 is a flowchart diagram at the time of performing the control of the power state in the MFP 100 of the embodiment.

As illustrated in FIG. 4, at the time of start of the MFP 100, the power state of the MFP 100 is shifted to the normal state (step S11).

Simultaneously with the shift of the power state of the MFP 100 to the normal state, the timer control unit 107 starts measuring lapse time in timer setting time in which waiting time from the normal power state to the power saving state is set by the timer (step S12).

Subsequently, by the input/output unit 19, the presence/absence of the panel operation input in the operation screen of the operation terminal 200 is determined (step S13). When there is no operation input in step S13 (NO in step S13), the timer control unit 107 continues measuring the lapse time by the timer. In step S14, the timer end determining unit 121 makes determination by comparing the lapse time measured by the timer and the timer setting time (step S14).

When it is determined by the timer end determining unit 121 in step S14 that lapse time>timer setting time (YES in step S14), the power state control unit 105 shifts the power state of the MFP 100 from the normal state to the power saving state (step S15). After that, in the power saving state, in step S13, the MFP 100 determines the presence/absence of an operation input in the operation screen of the operation terminal 200 by the input/output unit 19.

When it is determined by the timer end determining unit 121 in step S14 that lapse time<waiting time (NO in step S14), measurement by the timer is continued while the power state of the MFP 100 is the normal power state and, in step S13, the presence/absence of an operation input in the operation screen of the operation terminal 200 by the input/output unit 19 is determined.

When there is an operation input in the operation screen of the operation terminal 200 in step S13 (YES in step S13), the operation determining unit 102 determines whether the operation input to the operation screen is a "job execution instruction" or not (step S16). The "job execution instruction" refers to an operation which requires immediate execution of the image forming operation in the MFP 100.

When it is determined in step S16 that the information (operation) input to the operation screen is "job execution instruction" (YES in step S16), the measurement of the lapse time by the timer is stopped by the timer control unit 107 (step S20) and the job of the operation input to the operation screen is immediately executed by the main-body control unit 9 (step S21).

When it is determined in step S16 that the operation input to the operation screen is not "job execution instruction" (NO in step S16), whether the operation input to the operation screen is "job execution related instruction" or not is determined by the operation determining unit 102 (step S17). The "job execution related instruction" refers to an instruction of an operation directly connected to job execution such as a job setting operation or a job executing operation performed in the operation screen.

When it is determined in step S17 that the operation input to the operation screen is "job execution related instruction" (YES in step S17), the timer control unit 107 restarts the measurement of the timer setting time by the timer. It prevents the power state of the MFP 100 from easily shifting to the power saving state so that the handleability for the user can be assured.

When it is determined in step S17 that the operation input to the operation screen is not "job execution related instruction" (NO in step S17), the distance threshold determining unit 113 determines whether the distance between the MFP 100 and the operation terminal 200 measured by the distance measuring unit 103 exceeds a predetermined distance threshold or not (step S18).

Figure 5:
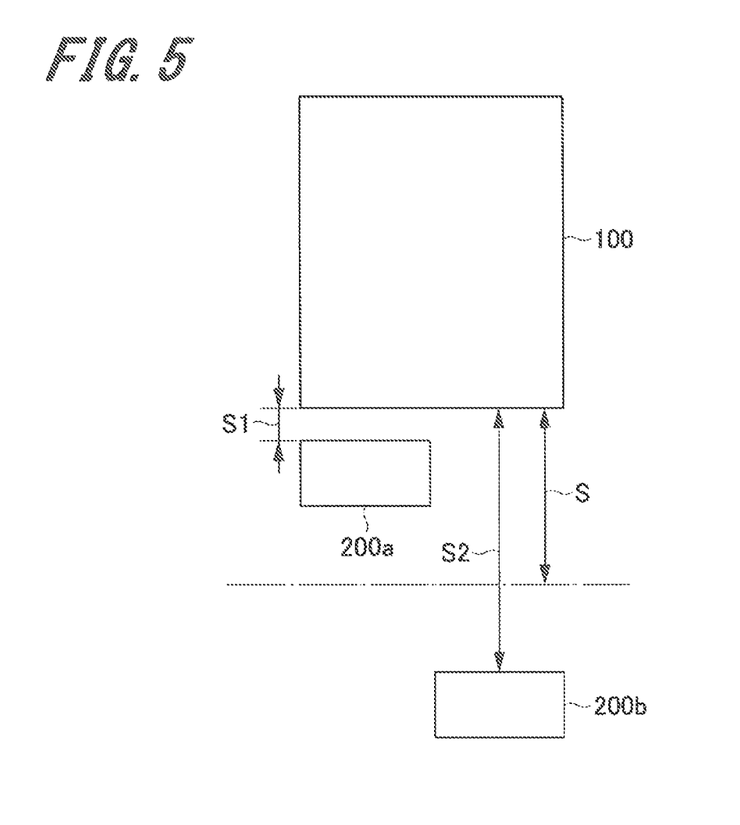
FIG. 5 is a conceptual diagram illustrating the relation between the distance between the MFP and the operation terminal and a distance threshold.

With reference to FIG. 5, the relation between the distance threshold and the distance between the MFP 100 and the operation terminal 200 measured by the distance measuring unit 103 will be described.

FIG. 5 is a conceptual diagram expressing the relations between distances S1 and S2 between the MFP 100 and the operation terminal 200 and a distance threshold S which is set.

As illustrated in FIG. 5, when the distance threshold determining unit 113 determines in step S18 that the distance S1 between the MFP 100 and an operation terminal 200a does not exceed the predetermined distance threshold S (YES in step S18), it is determined that the operation terminal 200a is at close range of the MFP 100. When it is determined that the operation terminal 200a is at close range of the MFP 100, in step S19, restart is performed by the timer control unit 107. It prevents the power state of the MFP 100 from easily shifting to the power saving state, and the device is maintained so as to be immediately used, so that the handleability for the user can be assured.

When the distance threshold determining unit 113 determines that the distance S2 between the MFP 100 and an operation terminal 200b exceeds the predetermined threshold S (NO in step S18), it is determined that the operation terminal 200b is at long range of the MFP 100. When it is determined that the operation terminal 200b is at long range from the MFP 100, the restart by the timer control unit 107 in step S19 is not performed. That is, since measurement of lapse time by the timer is continued, the power state of the MFP 100 easily shifts to the power saving state, so that energy saving can be achieved.

According to the embodiment, by considering the distance between the operation terminal 200 and the MFP 100, the handleability for the user can be improved and energy saving can be achieved. Specifically, when the operation terminal 200 is at close range of the MFP 100, by preventing the power state of the MFP 100 from easily shifting to the power saving state, the handleability for the user at the time of setting an original is assured. When the operation terminal 200 is at long range of the MFP 100, by making the power state of the MFP 100 easily shift to the power saving state, power saving can be achieved. Also in the case of executing a work which does not require setting of an original (for example, BOX print), when the operation terminal 200 is at long range of the MFP 100, it takes time until the user reaches the MFP 100. During the time, the MFP 100 is made easily shift to the power saving state. In such a manner, the power saving effect can be increased without giving the user a feeling of strangeness.

According to the embodiment, by considering an operation which is input to the operation screen of the operation terminal 200, the handleability for the user can be improved and energy can be saved. When an operation input to the operation terminal 200 is a job execution related operation, by preventing the power state of the MFP 100 from easily shifting to the power saving state, the handleability for the user is assured. When an operation input to the operation terminal 200 is not a job execution related operation, the power state of the MFP 100 is made easily shift to the power saving state to minimize the amount of power consumed by the MFP 100, so that energy saving can be achieved.

Example

Figure 6:
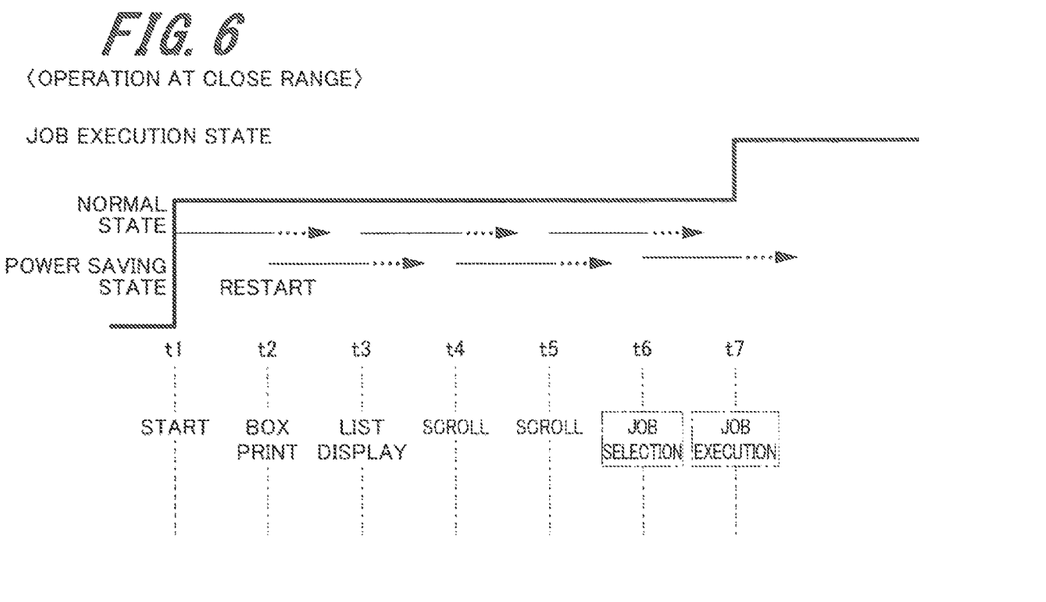
FIG. 6 is a diagram for explaining transition of a power state of the MFP in the case of operating an operation terminal at close range of the MFP.

FIG. 6 is a diagram for explaining transition of the power state of the MFP 100 in the case of operating the operation terminal 200 at close range of the MFP 100.

The vertical axis indicates the power state of the MFP 100 and expresses the power saving state, the normal state, and the job execution state from the bottom. The horizontal axis indicates operations input to the operation screen of the operation terminal 200 by the user along the time axis. The length of each of arrows in the diagram expresses the length of timer setting time, and the stair-like solid line expresses the transition state of the power state of the MFP 100.

As illustrated in FIG. 6, at start time t1 of the MFP 100, the power state of the MFP 100 is shifted to the normal state by the power state control unit 105 and, at the same time, measurement of the lapse time by the timer starts by the timer control unit 107. At time t2 of operation input of a BOX print, the measurement of the timer setting time by the timer is restarted by the timer control unit 107. At time t3 of operation input of list display, restart is performed by the timer control unit 107. Similarly, restart is performed by the timer control unit 107 also at times t4 and t5 of operation input of scroll and, during this period, the power state of the MFP 100 is maintained as the normal state.

At time t6 of operation input of job selection as "job execution related instruction", restart is performed by the timer control unit 107. At time t7 of operation input of job execution as "job execution instruction", measurement of lapse time by the timer is stopped by the timer control unit 107, and the power state of the MFP 100 is shifted to the job execution state to immediately execute an instructed job by the power state control unit 105.

Figure 7:
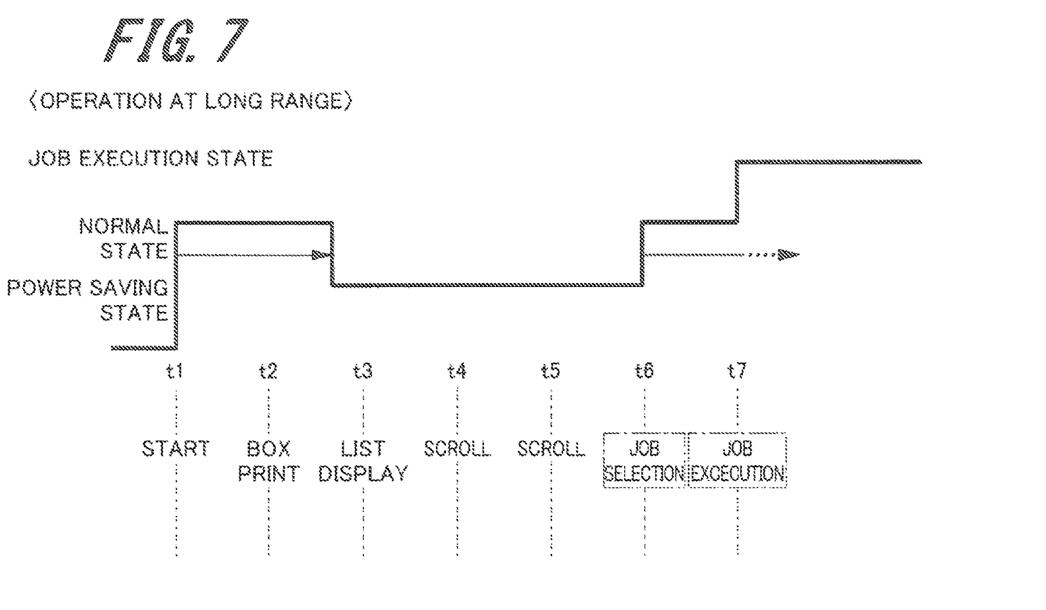
FIG. 7 is a diagram for explaining transition of the power state of the MFP in the case of operating the operation terminal at long range of the MFP.

FIG. 7 is a diagram for explaining transition of the power state of the MFP 100 in the case of operating the operation terminal 200 at long range of the MFP 100.

As illustrated in FIG. 7, at the start time t1 of the MFP 100, the power state of the MFP 100 is shifted to the normal state by the power state control unit 105 and, at the same time, measurement of the lapse time by the timer is started by the timer control unit 107. At the time t2 of operation input of a BOX print, restart by the timer is not performed by the timer control unit 107. Therefore, after lapse of the timer setting time, the power state of the MFP 100 is shifted to the power saving state by the power state control unit 105. After that, while the list display operation input time t3 and the scroll operation input times t4 and t5, the power state of the MFP 100 is maintained to the power saving state.

After that, at the time t6 of operation input of job selection as "job execution related instruction", the power state of the MFP 100 is reset to the normal state by the power state control unit 105 and, at the same time, measurement of the lapse time by the timer is started by the timer control unit 107. At the time t7 of operation input of the job execution as "job execution instruction", measurement of the lapse time by the timer is stopped by the timer control unit 107, and the power state of the MFP 100 is shifted to the job execution state by the power state control unit 105.

In the example, in the case of using the operation terminal 200 at close range from the MFP 100, the possibility that the MFP 100 is used immediately is high. Consequently, by making the power state of the MFP 100 easily maintained in the normal state, the handleability for the user is assured. On the other hand, in the case of using the operation terminal 200 at long range from the MFP 100, the possibility that the MFP 100 is used immediately is low. Consequently, the power state of the MFP 100 is positively shifted to the power saving state, thereby achieving power saving.

Figure 8:
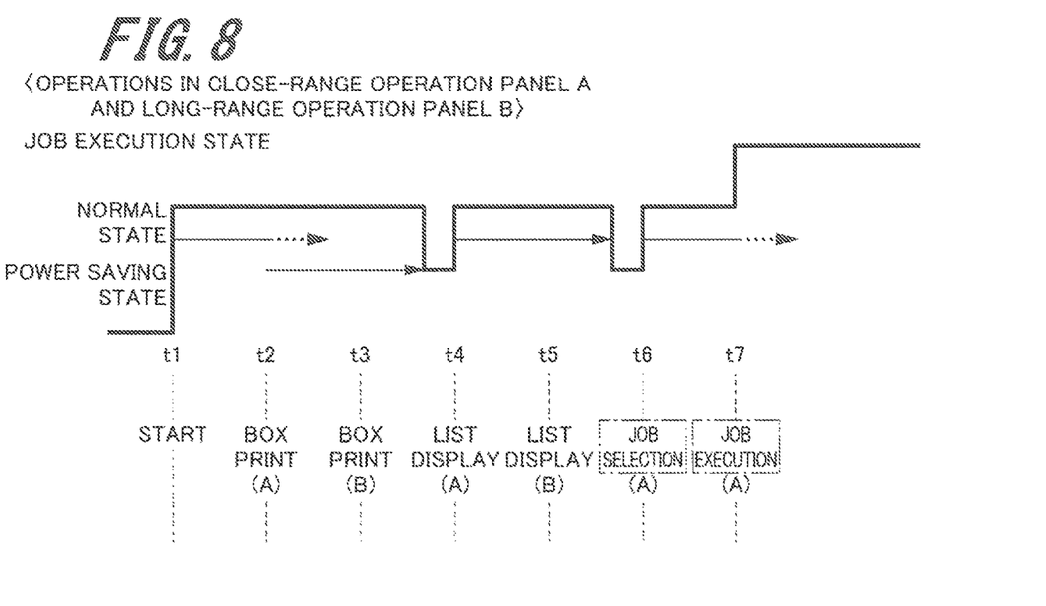
FIG. 8 is a diagram for explaining transition of the power state of the MFP in the case of using a plurality of operation terminals.

FIG. 8 is a diagram for explaining transition of the power state of the MFP 100 in the case of using a plurality of operation terminals 200 in positions of different distances. The case where the operation terminal 200a is used at close range S1 of the MFP 100 and the operation terminal 200b is used at long range S2 of the MFP 100 as illustrated in FIG. 5 will be described.

As illustrated in FIG. 8, at the start time t1 of the MFP 100, the power state of the MFP 100 is shifted to the normal state by the power state control unit 105 and, at the same time, measurement of the lapse time by the timer is started by the timer control unit 107. At time t2 of operation input of a BOX print to the operation terminal 200a at close range, restart is performed by the timer control unit 107. At time t3 of operation input of list display to the operation terminal 200b positioned at long range, restart by the timer control unit 107 is not performed. Consequently, after lapse of waiting time, the power state of the MFP 100 is shifted to the power saving state by the power state control unit 105.

At time t4 of operation input of list display to the operation screen of the operation terminal 200a, the power state of the MFP 100 is reset to the normal state by the power state control unit 105 and, at the same time, measurement of the lapse time in the waiting time by the timer is started by the timer control unit 107. At the time t5 of operation input of list display to the operation screen of the operation terminal 200b, restart of the measurement of the lapse time by the timer control unit 107 is not performed. Consequently, after lapse of the waiting time, the power state of the MFP 100 is shifted to the power saving state by the power state control unit 105.

After that, at time t6 of operation input of job selection to the operation terminal 200b, the power state of the MFP 100 is reset to the normal state by the power state control unit 105 and, at the same time, measurement of the lapse time by the timer is started by the timer control unit 107. At time t7 of operation input of job execution to the operation terminal 200b, measurement of lapse time by the timer is stopped by the timer control unit 107, and the power state of the MFP 100 is shifted to the job execution state to immediately execute the job of the input operation by the power state control unit 105.

In the example, in the case where a plurality of operation terminals are used and the terminal device is used at close range of the MFP 100, by making the power state of the MFP 100 easily maintained in the normal state, the handleability is improved. When the terminal device is used at long range of the MFP 100, by positively shifting the power state of the MFP 100 to the power saving state, energy saving is achieved.

Figure 9:
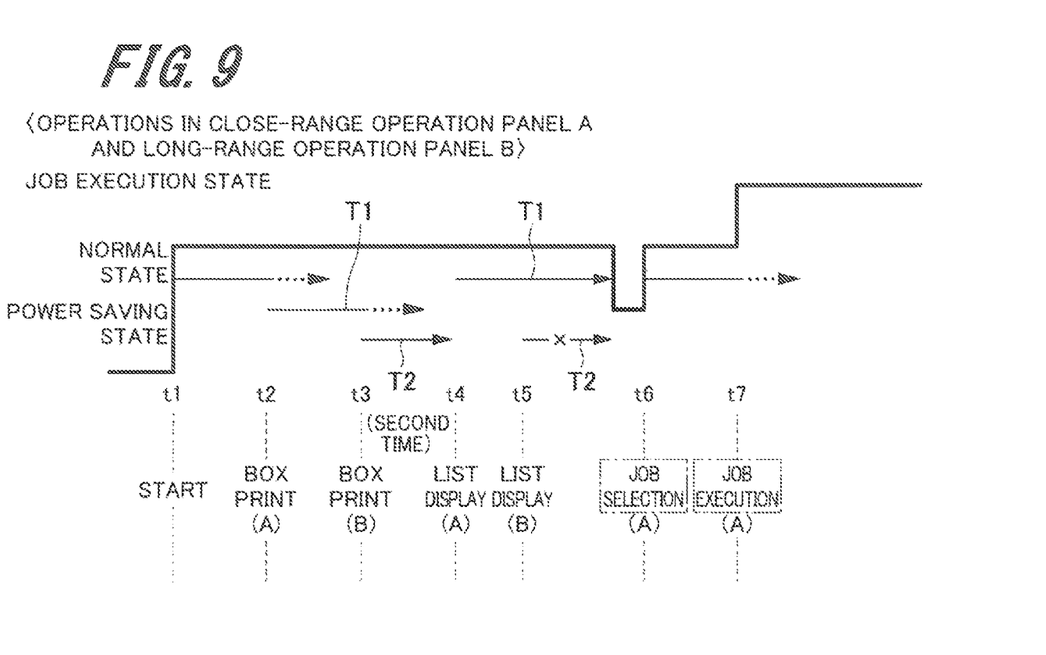
FIG. 9 is a diagram for explaining transition of the power state of the MFP in the case where different waiting times are set.

FIG. 9 is a diagram for explaining transition of the power state of the MFP 100 in the case where the plurality of terminal devices 200 are used and timer setting times (waiting times) are different. Description will be given based on the case where timer setting time T1 (first waiting time) of the operation terminal 200a used at close range of the MFP 100 is longer than timer setting time T2 (second waiting time) of the terminal device 200b used at long range of the MFP 100.

As illustrated in FIG. 9, at start time t1 of the MFP 100, the power state of the MFP 100 is shifted to the normal state by the power state control unit 105 and, at the same time, measurement of the lapse time in first setting time T1 by the timer is started by the timer control unit 107. At time t2 of operation input of a BOX print to the operation terminal 200a, restart due to the first setting time T1 is performed by the timer control unit 107.

At time t3 of operation input of a BOX print to the operation terminal 200b, by the timer end determining unit 121, remaining times of the first setting time S1 and the second waiting time T2 are compared. Since the second waiting time T2 is longer than the remaining time of the first waiting time T1, restart due to the second waiting time T2 is performed by the timer control unit 107. At t4 of operation input of list display to the operation terminal 200a, restart due to the first waiting time T1 is performed by the timer control unit 107.

At time t5 of operation input of list display to the operation terminal 200b, by the timer end determining unit 121, remaining times of the first waiting time T1 and the second waiting time T2 are compared. Since the remaining time of the first waiting time T1 is longer than the second waiting time T2, restart due to the second waiting time T2 is not performed by the timer control unit 107. Consequently, after lapse of the first waiting time T1, the power state of the MFP 100 is shifted to the power saving state by the power state control unit 107.

After that, at time t6 of operation input of job selection to the operation terminal 200a, the power state of the MFP 100 is reset to the normal state by the power state control unit 107 and, at the same time, measurement of lapse time in the first waiting time T1 is started by the timer control unit 105. At time t7 of operation input of the job execution to the operation terminal 200a, measurement of the lapse time by the timer is stopped by the timer control unit 105, and the power state of the MFP 100 is shifted to the job execution state by the power state control unit 107.

In the example, in the case of using the plurality of operation terminals 200a and 200b, by comparing the timer setting times T1 and T2 of the operation terminals, the number of times of restart by the timer control unit 107 is decreased, and the control load on the device can be decreased.

In the example, by using the first waiting time T1 as a first shift condition and using the second waiting time T2 as a second shift condition, different shift conditions are set. By providing a plurality of shift conditions of shifting from the power saving state to the normal power state, for example, by using the second waiting time T2 as the shift condition, the power state of the MFP 100 can be easily shifted from the normal power state to the power saving state.

Figure 10A:
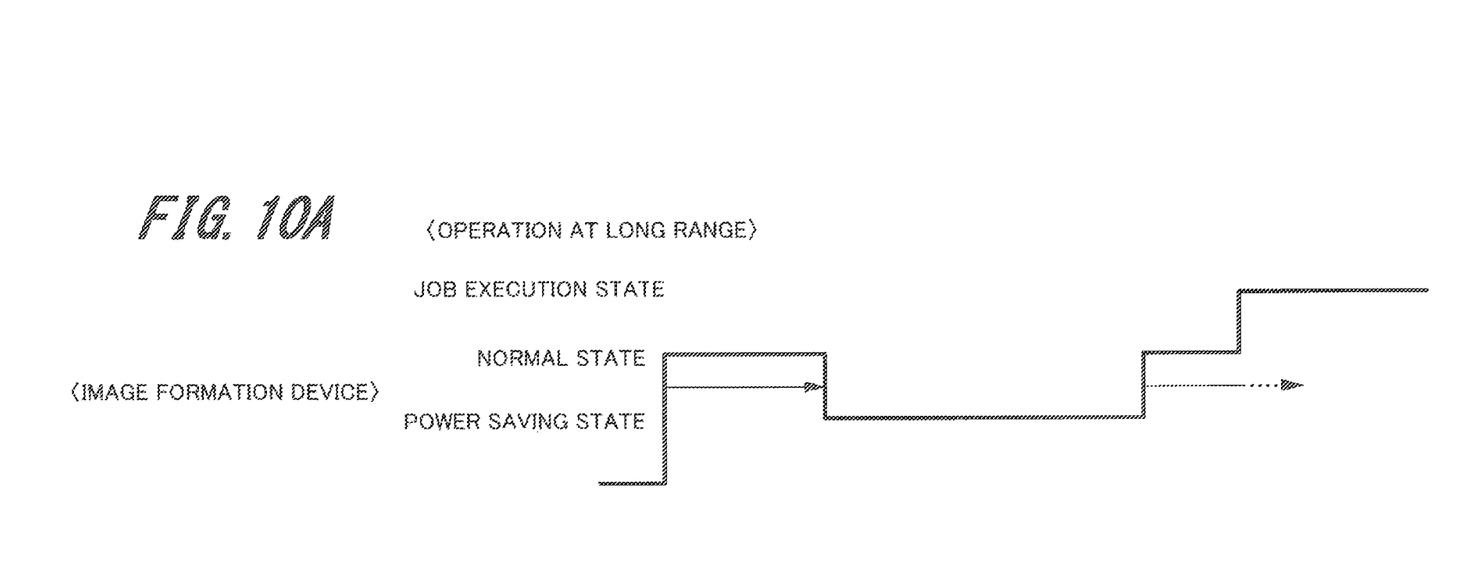
FIGS. 10A and 10B are diagrams in which transition of the power state of the MFP and transition of brightness of the operation panel of the operation terminal are compared.
Figure 10B:
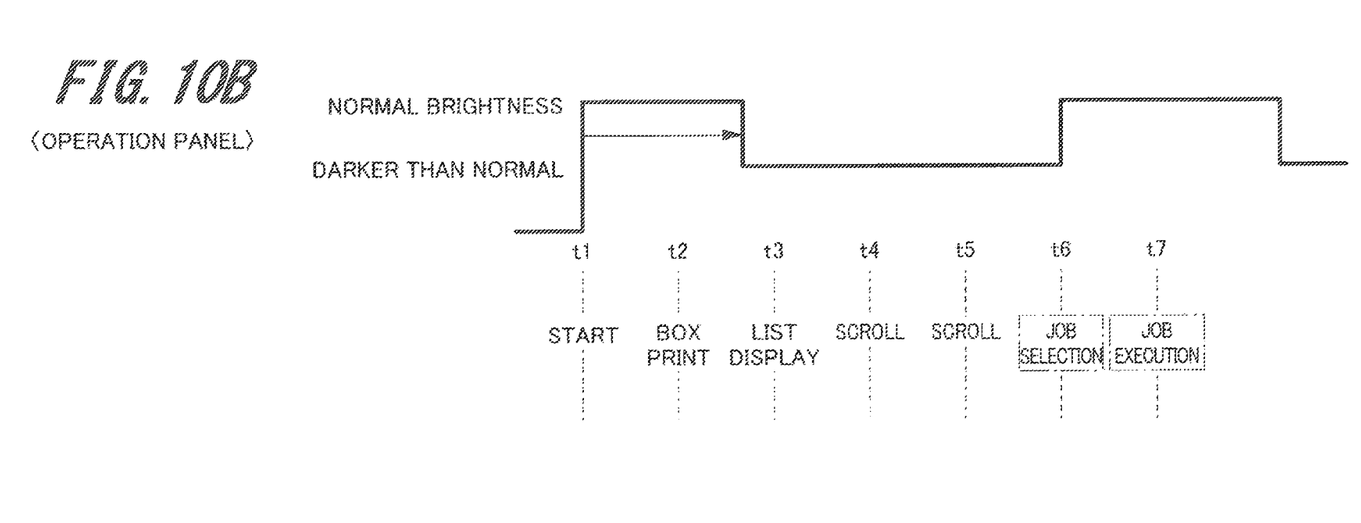

FIGS. 10A and 10B are diagrams which compare transition of the power state of the MFP 100 and transition of brightness of the operation panel 21 of the operation terminal 200. FIG. 10A indicates the transition state as same as FIG. 7 and its description will not be repeated.

FIG. 10B is a diagram for explaining the transition state of brightness of the operation panel 21. The vertical axis of FIG. 10B indicates the brightness states of the operation panel 21, which are a state darker than normal brightness and a normal brightness state. The horizontal axis indicates operations input to the operation panel 21 by the user along the time axis. The stair-like solid line in the diagram expresses the transition of the brightness state of the operation panel 21.

As illustrated in FIGS. 10A and 10B, in the example, the power state of the MFP 100 and the brightness state of the operation panel 21 are synchronized. When the power state of the MFP 100 shifts from the normal state to the power saving state as illustrated in FIG. 10A, the brightness state of the operation panel 21 also shifts from the normal brightness state to the state darker than the normal brightness as illustrated in FIG. 10B. In the case where the power state of the MFP 100 is maintained in the power saving state, the brightness state of the operation panel 21 is also maintained in the state darker than the normal brightness. After that, when the power state of the MFP 100 is reset to the normal state, the brightness state of the operation panel 21 is also reset to the normal brightness state.

After lapse of a predetermined period since the power state of the MFP 100 shifts to the job execution state, the brightness state of the operation panel 21 shifts to the state darker than the normal brightness.

In the example, when the power state of the MFP 100 is the normal state, the possibility that the user uses the operation panel 21 is high. Consequently, by maintaining the brightness state of the operation panel 21 in the normal brightness, the handleability for the user is assured. When the power state of the MFP 100 is the power saving state, the possibility of use by the user is low. Consequently, by making the brightness state of the operation panel 21 darker than the normal brightness, energy saving is achieved. That is, by synchronizing the power state of the MFP 100 and the brightness state of the operation panel 21, the handleability for the user is maintained and energy saving can be achieved. Further, after the power state of the MFP 100 shifts to the job execution state, the possibility that the user operates the operation panel 21 becomes low. Consequently, by shifting the brightness state of the operation panel 21 to the state darker than the normal brightness, further energy saving can be realized.

Also when the operation panel 21 is used in a state where it is detached from the MFP 100, the power state of the MFP 100 and the brightness state of the operation panel 21 may be synchronized.

As described above, according to the image formation system and the control method of the image control system of the embodiment, improvement in the handleability of the user and energy saving in the image formation device can be achieved. According to the image formation system and the control method of the image control system of the embodiment, when an "operation which is not directly connected to job execution" is performed in the operation screen of the terminal device, by positively setting the power state of the image formation device to the power saving state, energy saving can be realized.

The embodiment has been specifically described to elaborate the present invention and is not always limited to a system having all of the components described. For example, a part of the components of an embodiment can be replaced to components of another embodiment, and a component of an embodiment can be added to a component of another embodiment. A part of the components of each of the embodiments can be eliminated or replaced by another component, or another component can be added.

Figure 11:
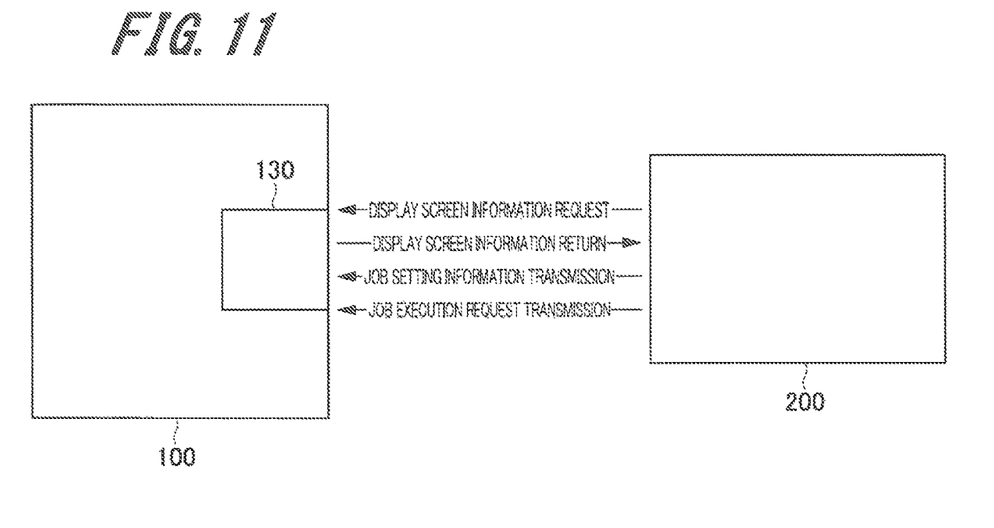
FIG. 11 is a schematic configuration diagram in the case where the MFP is provided with an internal Web server function in the image formation system according to the embodiment of the present invention.
Figure 12:
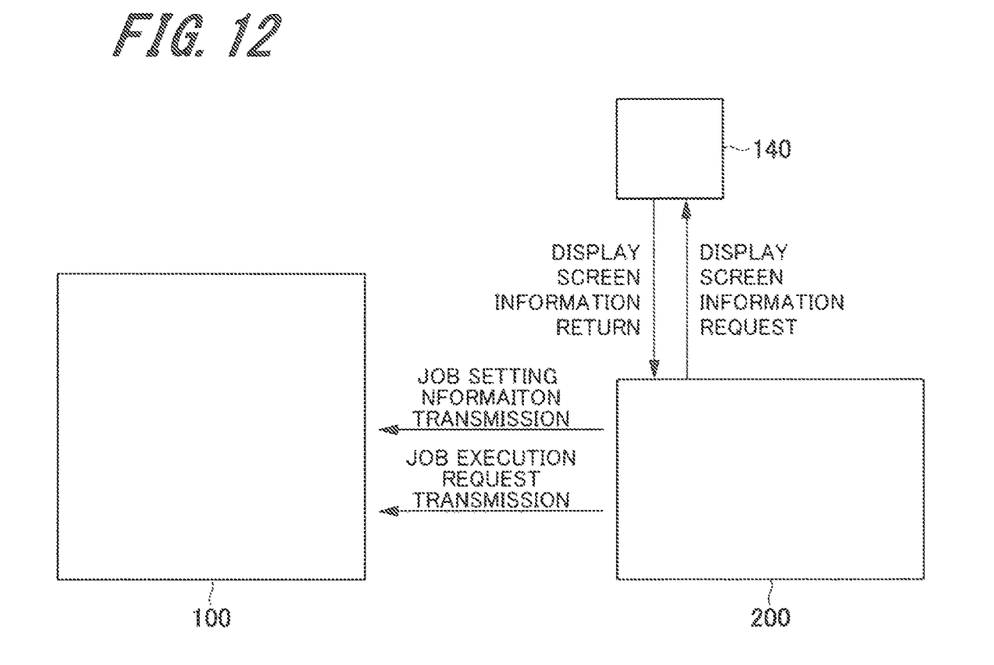
FIG. 12 is a schematic configuration diagram in the case where an external Web server is mounted in the image formation system according to the embodiment of the present invention.

For example, as illustrated in FIG. 11, the panel image generating unit 14 in the MFP 100 is provided with the function of a web server, and image information of an operation screen generated can be sent to the operation terminal 200. As illustrated in FIG. 12, an external web server may be provided separately from the MFP 100, and image information of an operation screen generated can be sent to the operation terminal 200.

Although the embodiments of the present invention have been described and illustrated in detail, the disclosed embodiments are made for purposes of illustration and example only and not limitation. The scope of the present invention should be interpreted by terms of the appended claims.

REFERENCE SIGNS LIST 1 image formation system
9 main-body control unit
10 CPU
11 ROM
12 RAM
13 storage unit
14 panel image generating unit
15 image forming unit
16 image reading unit
17 display unit
18 sensor unit
19 input/output unit
20 power supply unit
21 operation panel
22 LED
101 wireless communication unit
102 operation determining unit
103 distance measuring unit
104 power mode determining unit
105 power state determining unit
107 timer control unit
108 terminal device detecting unit
113 distance measuring unit
121 timer end determining unit
130 internal web server
140 external web server
100 image forming device (MFP)
200 terminal device (operation terminal)
201 terminal wireless communication unit
209 terminal control unit
217 terminal display unit

What is claimed is:

1. An image formation system comprising:
an image formation device; and
a terminal device operating the image formation device, and
having a plurality of power states including a normal power state of waiting in a state where a job can be executed in the image formation device and a power saving state of waiting in a state where a job cannot be executed in the image formation device and a state where power consumed is smaller than power in the normal power state,
wherein the system comprises:
an operation determining unit determining an operation which is input to an operation screen of the terminal device;
a shift condition setting unit setting, from a plurality of shift conditions, on the basis of whether an operation determined by the operation determining unit is directly connected to job execution or is not directly connected to job execution, a shift condition which, when met, will cause shifting the image formation device to a predetermined power state; and
a power state control unit shifting the image formation device to a predetermined power state when the shift condition set by the shift condition setting unit is met.

2. The image formation system according to claim 1, further comprising a distance measuring unit measuring distance from the image formation device to the terminal device,
wherein the shift condition setting unit sets the shift condition on the basis of a measurement result of the distance measuring unit in addition to whether the operation determined by the operation determining unit is directly connected to job execution or is not directly connected to job execution.

3. The image formation system according to claim 2, wherein the distance measuring unit measures the distance from the image formation device to the terminal device on the basis of intensity of an electric wave between the image formation device and the terminal device.

4. The image formation system according to claim 2, comprising a plurality of terminal devices,
wherein the distance measuring unit measures distance from the image formation device on the basis of a terminal device which communicated with the image formation device last in the plurality of terminal devices.

5. The image formation system according to claim 1, wherein as a power saving shift condition of shifting from the normal power state to the power saving state, at least a first shift condition and a second shift condition different from the first shift condition are provided.

6. The image formation system according to claim 5, wherein a distance threshold related to the distance from the image formation device to the terminal device is provided, and
the shift condition setting unit sets the second shift condition as the power saving shift condition when the distance from the image formation device to the terminal device measured by the distance measuring unit exceeds the distance threshold and when the operation determined by the operation determining unit is not directly connected to job execution.

7. The image formation system according to claim 6, further comprising a terminal attachment detecting unit detecting whether the terminal device is attached to the image formation device or not,
wherein when the terminal attachment detecting unit detects that the terminal device is attached to the image formation device, the distance measuring unit sets the distance from the image formation device to the terminal device to equal to or less than the distance threshold.

8. The image formation system according to claim 6, wherein the distance threshold is set according to distance from the image formation device to the terminal device measured by the distance measuring unit.

9. The image formation system according to claim 6, wherein the distance threshold is set according to rise time necessary for the image formation device to shift from the power saving state to the normal power state.

10. The image formation system according to claim 5, wherein the first shift condition is first waiting time set as waiting time for the image formation device to shift from the normal power state to the power saving state, and the second shift condition is second waiting time set as waiting time shorter than the first waiting time.

11. The image formation system according to claim 10, further comprising a timer control unit having a timer measuring lapse time in the waiting time,
wherein the timer control unit performs timer restart which restarts measurement of waiting time by the timer on the basis of an operation input to the operation screen.

12. The image formation system according to claim 11, wherein the timer control unit does not perform the timer restart when remaining time of the first waiting time measured by the timer is longer than the second waiting time.

13. The image formation system according to claim 1, wherein the operation determining unit determines a job setting operation or a job executing operation input to the operation screen as an operation directly connected to job execution and determines an image transition operation input to the operation screen as an operation which is not directly connected to job execution.

14. The image formation system according to claim 1, wherein when the power state of the image formation device shifts to the power saving state, brightness of the display unit displaying the operation screen of the terminal device is made darker than that in the normal state.

15. The image formation system according to claim 1, wherein the image formation device has a Web server, and the Web server generates screen information to be displayed on the operation screen of the terminal device and transmits the generated screen information to the terminal device in accordance with a request of the terminal device.

16. The image formation system according to claim 1, further comprising an external Web server mounted in a place different from the image formation device,
wherein the terminal device obtains screen information displayed on the operation screen generated by the external Web server by accessing the external Web server.

17. A control method of an image formation system comprising:
an image formation device; and
a terminal device operating the image formation device, and
having a plurality of power states including a normal power state of waiting in a state where a job can be executed in the image formation device and a power saving state of waiting in a state where a job cannot be executed in the image formation device and a state where power consumed is smaller than power in the normal power state,
the method comprising:
determining an operation which is input to an operation screen of the terminal device so as to distinguish an operation directly connected to job execution and an operation which is not directly connected to job execution;
setting, on the basis of whether a determined operation is directly connected to job execution or is not directly connected to job execution, from a plurality of shift conditions, a shift condition which, when met, will cause shifting to a predetermined power state; and
shifting the image formation device to a predetermined power state when the set shift condition is met.

* * * * *